US010227778B2

(12) United States Patent
Schroeder et al.

(10) Patent No.: US 10,227,778 B2
(45) Date of Patent: Mar. 12, 2019

(54) SHEET, BOARD OR PANEL

(71) Applicant: MAYFAIR VERMÖGENSVERWALTUNGS SE, Hamburg (DE)

(72) Inventors: Eric Schroeder, Athus (BE); Jeroen Nijsse, Hoedekenskerke (NL)

(73) Assignee: Mayfair Vermögensverwaltungs SE (DE)

( * ) Notice: Subject to any disclaimer, the term of this patent is extended or adjusted under 35 U.S.C. 154(b) by 12 days.

(21) Appl. No.: 15/513,827

(22) PCT Filed: Aug. 27, 2015

(86) PCT No.: PCT/EP2015/059586
§ 371 (c)(1),
(2) Date: Mar. 23, 2017

(87) PCT Pub. No.: WO2016/055215
PCT Pub. Date: Apr. 14, 2016

(65) Prior Publication Data

US 2017/0292270 A1 Oct. 12, 2017

(30) Foreign Application Priority Data

Oct. 9, 2014 (DE) ........................ 10 2014 220 459

(51) Int. Cl.
*B32B 5/08* (2006.01)
*E04C 2/16* (2006.01)
(Continued)

(52) U.S. Cl.
CPC .................. *E04C 2/16* (2013.01); *B27N 1/00* (2013.01); *B27N 3/04* (2013.01); *B27N 3/143* (2013.01);
(Continued)

(58) Field of Classification Search
CPC ....... Y10T 428/253; Y10T 428/249925; Y10T 428/24058; B32B 5/08; B32B 5/02; B32B 5/16
See application file for complete search history.

(56) References Cited

U.S. PATENT DOCUMENTS 4,690,874 A 9/1987 Sauer et al.
5,932,038 A 8/1999 Bach et al.

FOREIGN PATENT DOCUMENTS

CA 2211472 1/1999
CA 2296554 2/1999
(Continued)

OTHER PUBLICATIONS

PCT Search Report and Written Opinion for PCT/EP2015/069586, completed Sep. 25, 2015.

*Primary Examiner* — Alexander S Thomas
(74) *Attorney, Agent, or Firm* — Barnes & Thornburg LLP

(57) ABSTRACT

Sheet, board or panel, in particular an OSRB (1)—Oriented Structural Reed Board—comprising a layer of material (2) made up of pressed reeds having a multiplicity of stems which are split predominantly longitudinally, so that it is also the case that the insides of the stems, at least in part, are accessible to a binder, wherein the binder is able to hold together the reeds for forming a solid sheet, board or panel. It is thus possible to provide a biocomposite sheet, board or panel based on sustainable raw materials which has improved properties and strength and requires only a particularly low level of production outlay. A further aspect of the invention relates to a method for producing an OSRB (1).

10 Claims, 2 Drawing Sheets

Figure 1:
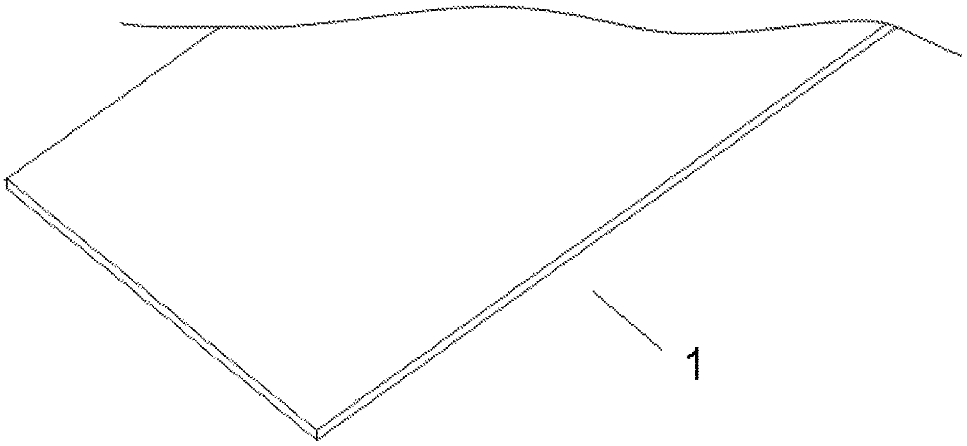

(51) Int. Cl.

| | |
|---|---|
| ***B27N 1/00*** | (2006.01) |
| ***B27N 3/04*** | (2006.01) |
| ***B27N 3/14*** | (2006.01) |

(52) U.S. Cl.
CPC .. *Y10T 428/249925* (2015.04); *Y10T 428/253* (2015.01)

(56) References Cited

FOREIGN PATENT DOCUMENTS

| | | |
|---|---|---|
| CH | 251315 | 10/1947 |
| DE | 1012748 | 7/1857 |
| DE | 807643 | 7/1951 |
| WO | WO2002/002886 | 1/2002 |
| WO | WO2008/055635 | 5/2008 |
| WO | WO2009/135798 | 11/2009 |

SHEET, BOARD OR PANEL

CROSS-REFERENCE TO RELATED APPLICATIONS

This application is the U.S. national phase of PCT/EP2015/069586, filed on Aug. 27, 2015, which claims priority to German Patent Application 102014220459.3, filed on Oct. 9, 2014. The disclosures of both German Patent Application 102014220459.3 and PCT/EP2015/069586 are hereby incorporated herein by reference in their entireties.

The invention concerns a sheet, board or panel, in particular OSRB panel—Oriented Structural Reed Board—, as well as a production method.

For some years now, the aim to create sheets, boards or panels as construction material made of sustainable, regrowing raw materials, preferably made of waste products of the agriculture sector such as for example straw, has been increasingly pursued. Wood as raw material such as in form of fine wood chips or wood chips are not regarded as sustainable given the world wide shrinking stock of trees. Depending on the reached mechanical properties, sheets, boards or panels that are based on such sustainable, regrowing raw materials can be used as none load bearing or even load bearing construction panels respectively biocomposite construction panels in the construction industry.

The patent CA02296554C discloses a method to produce an OSSB panel—Oriented Straw Strand Board—, wherein split, with a binder treated straw is compressed to an OSSB panel for applications in the construction industry. For an industrial implementation of the teaching of the CA02296554C and for the feasibility of a commercial respectively economical production of such OSSB panels, there are however especially two substantial barriers.

On the one hand, the relevant legal requirements concerning the properties, in particular mechanical strength, for obtaining market acceptance and for the product authorization have to be fulfilled. On the other hand, the production outlay and the production costs have to be kept low in order to allow offering and providing an OSSB panel as a biocomposite construction panel for a marketable price.

However, the present knowledge about the properties of natural raw materials for the production of biocomposite construction panels is like the knowledge about the corresponding production methods still comparatively little. Furthermore, the existing know-how of the wood industry such as from the processing of fine wood chips and wood chips to form construction panels can be transferred only partly and limitedly to these kinds of raw materials such as straw.

This issue is also discussed in the document WO0202886, page 4, lines 19 to 27, and on page 5, line 28, to page 6, line 12, further shortcomings of the method of the teaching of CA02296554—with reference to the US subsequent application U.S. Pat. No. 5,932,038 (Bach et al.)—are pointed out.

The above mentioned problems result in that for industrial production of biocomposite construction panels in particular according to the teaching of CA02296554C, certain product properties such as strength targets can currently only be reached by high scrap rate and/or by for example the addition of a higher quantity of binder. However, both increase the production outlay and the production costs.

The aforementioned features known from the state of the art can be alone or in arbitrary combination be combined with one of the objects according to the invention as described in the following.

It is objective of the invention to provide a further developed sheet, a board or a panel of sustainable, natural, regrowing plant-based raw materials that can be produced in an improved manner.

For the solution of the problem serve a sheet, a board or a panel according to the main claim as well as a method of the independent claim. Preferable embodiments result from the dependent claims.

For the solution of the problem serve a sheet, a board or a panel, in particular OSRB panel—Oriented Structural Reed Board—, comprising a layer of material of compressed reed having a multiplicity of strands, which are mostly split longitudinally, so that at least a part of the inside of the strands is accessible to a binder, wherein the binder allows to binding the reed for forming respectively creating a solid sheet, a solid board or panel—in the following also called construction panel to simplify.

The expression "reed" is also known under the names "Reet", "Ried", "Reth", "Rieth", "Reith", "Ret", "Rädje", common reed or pond reed. In particular, the strands of the reed are afloat spears, i.d. the part of a reed spear extending from the water surface to the end of the reed spear.

Compared to the underwater spear, improved mechanical properties of the construction panel as well as an improved processability can be achieved by means of using only afloat spears.

A layer of material of compressed reed can represent two things:

First, that only reed as raw material for all strands of the layer is provided for the layer of material.

Second, that the layer of material comprises a portion of reed, thus that not only reed as raw material for all strands of the layer is provided.

Experiments have shown that reed as sustainable, natural, regrowing plant-based raw material allows noticeable improvement of the properties and the production process of construction panels respectively biocomposite construction panels.

The advantageous effects, which will be further described in the following in detail, have until now not been associated with the raw material reed.

Moreover, blended construction panels based on reed and another sustainable, natural, regrowing plant-based raw material such as for example straw surprisingly reveals in part additional advantageous effects compared to 100% reed construction panels.

The following three alternative embodiments of a plate, a board or a panel have proven in this course as in particular advantageous:

The first to be mentioned is the 100%-reed-construction-panel, wherein a portion of 100% of the strands provided for the layer of material are of reed, thus only reed strands.

With "provided" it is meant that strands of other raw materials, which get unintentionally into the construction panel in the course of production, are not considered.

A 100%-reed-construction-panel can be provided with nearly 100% split strands. In comparison to that, a 100%-straw-construction-panel can currently be only produced with about at most 90% to 95% split strands.

A 100%-reed-construction-panel having particular high density and mechanical strength values such as modulus of elasticity, bending strength or nail holding strength in the area of e.g. Plywood panels and possibly above that can be realized. The strand length is by many times longer than that at HDF or HDP panels. A construction panel in the premium segment on the basis of a sustainable, natural, regrowing plant raw material is thereby made possible.

Furthermore, reed strands allow a particularly high working speed in the hot press and the produced construction panels reveal a comparatively high moisture content.

As second to be mentioned is the reed-addition-construction-panel, wherein additional reed strands are provided or added, respectively, for the layer of material of a raw material, which is not reed. In this course, a portion of strands of reed of at least 10%, preferably 15%, particularly preferred 20% and/or at most 40%, preferably at most 35%, particularly preferred at most 30%, has proven to be particularly advantageous. A sheet, a board or panel can thereby be created with particularly little binder content and/or little scrap rate.

An example for this—as third—is to be mentioned the straw-reed-construction-panel, wherein strands only based on reed and straw are provided for the layer of material, thus no strands of other raw materials are added. Preferably, the straw portion is then higher than the reed portion, in particular in the portion ranges as rendered more precisely in the preceding paragraph.

In order to produce a load bearing construction panel with straw as raw material, an increased binder addition is necessary for the reasons described in the introductory section, which increase the production outlay. Furthermore, bubbles are formed increasingly during the hot pressing process, which leads to a high scrap rate. This increase the production expenditures and reduces the strength.

By means of the addition of reed in the above mentioned portion ratios, bubble formation during the hot pressing process can be effectively counteracted or even avoided. A particularly low scrap rate can be achieved. A high working speed in the hot press, which was enabled by means of the reed addition, allows for a particularly high production efficiency and reduced production outlay.

If for example 25% reed is blended with 75% straw and processed to a load bearing construction panel, then at constant density and strength the scrap rate can be reduced up to 20% and at the same time binder be saved (reduced) by up to 15% compared with a pure straw panel.

Furthermore, the straw-reed-construction-panel reveals a particularly high moisture content, which allows the plate, the board or the panel to not deform unintentionally later on after the assembly due to an increased air humidity of the environment.

As fourth to be mentioned is the reed-blend-construction-panel, wherein the portion of reed is higher than that of other raw materials respectively of strands of other raw materials in the layer of material. Through this, a plate, a board or a panel of sustainable, natural, regrowing plant raw material with particularly high density, strength and production efficiency can be provided. The other raw material, e.g. straw, may then reduce the production expenditures due to local availability compared to a 100%-reed-construction-panel and/or the density can be purposefully reduced.

In particular, a further raw material for the strands may be added to the above described four embodiments. Herewith, the flexibility of the production concerning the used raw materials can be increased and the manufacturing may thereby be adapted to the local raw material availability as well as the current market prices for the purpose of a particularly little production outlay.

The term "straw" refers to the straw from the common parlance in the narrower sense like for example crop straw or rice straw.

In particular, independent from the raw material, all strands of the layer of material are mostly split longitudinally (majority among all strands are split longitudinally), so that at least a part of the inside of the strands is accessible to a binder, wherein the binder allows to binding the strands for forming a solid sheet, board or panel.

In one embodiment, the sheet, the board or the panel are composed such that when providing strands based on different raw materials, blending, thus adding together and blending, of the strands is provided prior to compressing to a sheet, a board or panel, and/or blending of the strands is provided prior to scattering onto a conveyor belt for forming a mat. Hereby, a biocomposite construction panel with particularly high strength properties and little production outlay can be provided.

In one embodiment, the sheet, the board or the panel are composed such that a plurality of the strands of the layer of material are oriented in a predetermined direction and/or substantially in parallel. A particularly high strength can thereby be achieved.

In one embodiment, the sheet, the board or the panel are composed such that at least a plurality of strands are at least partly dewaxed. A biocomposite construction panel with particularly high strength can thereby be provided.

In one embodiment, the sheet, the board or the panel are composed such that a portion of at least 10%, preferably 15%, particularly preferred 30%, of the strands have a length of at least 6 mm, preferably 8 mm, and/or at most 15 mm, preferably at most 10 mm. A sheet, a board or panel with particularly high quality can be obtained.

In one embodiment, the sheet, the board or the panel are composed such that the binder is a resin, preferably resin without formaldehyde, in particular isocyanate resin, preferred p-MDI (polymeric DiphenylMethane-Diisocyanate), and/or an extender for extending the resin, in particular DPMA (DipropyleneGlycolMonomethylEtherAcetate), is added to the binder. A sheet, a board or panel with particularly good health compatibility can be provided.

In one embodiment, the sheet, the board or the panel are composed such that the layer of material of compressed reed forms an outer layer, which adjoins to a core layer.

Outer layer means a layer in the outer area, which may be covered by a further outer arranged layer, e.g. a cover layer with a decor printed on it and/or covered by a varnish layer.

By means of providing an outer layer and a core layer, further sustainable materials without strand structure such as for example recycling material can be used for the production of a construction panel.

A further aspect of the invention concerns a method for producing a sheet, a board or a panel, in particular OSRB panel—Oriented Structural Reed Board—, in particular with at least one of the above described features, wherein strands that are mostly split longitudinally are covered with a binder and are compressed, and the strands only or in part originate from reed.

The method allows to creating construction panels respectively biocomposite construction panels on the basis of sustainable, natural, regrowing plant raw materials with high density and improved properties such as in particular high moisture content or mechanical strength at particularly few production outlay at the same time. The advantageous effects were already described above.

In one embodiment of the method, the strands of different raw materials, in particular including straw, are blended with each other.

By means of the blending of the strands of different raw materials, the formation of bubbles and inclusions during the hot pressing procedure can be reduced and a particular low scrap rate be achieved.

In one embodiment of the method, blending of the strands is conducted prior to scattering the strands onto a conveyor belt for forming a mat, in particular prior to shortening respectively cutting the strands to a smaller length.

This sequence of blending and scattering and in particular shortening further facilitates the above described advantageous effects.

In one embodiment of the method, the strands are shortened in length to at least 90 mm, preferably at least 100 mm and/or at most 200 mm, preferably at most 150 mm, wherein the shortening is conducted in particular prior to a longitudinally splitting of the strands.

The above described shortening and in particular this sequence enables to providing a sheet, a board or a panel with particularly low production outlay. Clogging of the machines e.g. for longitudinally splitting can thereby be counteracted or entirely avoided.

The features mentioned in the introduction section of the description, the embodiments, the figure description and the embodiment examples and embodiments described in the following as well as in the claims are applicable alone as well as in arbitrary manner combinable with each other. The disclosure of the invention is therefore not limited to the described respectively claimed combinations of features. All feature combinations are rather considered to be disclosed.

In the following, the invention is elucidated in more detail based on embodiment examples of a sheet, a board or a panel, which are schematically illustrated in the figures, and the embodiments as well as additional advantageous embodiments are described in more detail with reference to the drawings.

It shows:

FIG. 1: Schematic illustration of an OSRB construction panel

Figure 2:
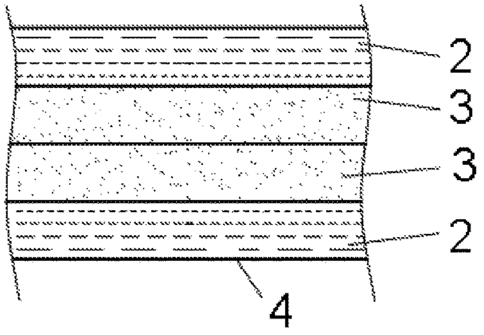

FIG. 2: Schematic illustration of a cross section through an OSRB plate, board or panel with several layers of material FIG. 3: Schematic illustration of a cross section through an OSRB plate, board or panel with one layer of material FIG. 4: Flow chart with the steps for the production of an OSRB plate, an OSRB board or an OSRB panel based on reed and straw.

The FIG. 1 shows an OSRB construction panel 1—surface structure not shown—having a thickness in the range of at least 3 mm, preferably 8 mm, to at most 40 mm or even higher.

Load bearing OSRB construction panels 1 have for example a minimum density of 500 $kg/m^3$ to above 900 $kg/m^3$ at 15 mm panel thickness. Not load bearing OSRB construction panels commonly have a lower density, however at least 400 $kg/m^3$ or 500 $km/m^3$.

One embodiment example of a 100% reed-construction-panel may achieve a density of above 800 $kg/m^3$. A particularly high strength can thereby be made possible. Compared to construction panels based on e.g. straw, a higher compatibility (tolerance) for a person suffering from an allergy can be enabled.

One embodiment example of a reed-blend-construction-panel in form of a flooring panel on the basis of straw under addition of reed is particularly suitable for wet areas like in the bath room compared to a pure OSSB panel. A particularly low swelling at the gap between two flooring panels in consequence of wetness can be made possible.

The FIG. 2 shows the cross section through an ORSB construction panel with two outer layers 2 and two core layers 3. The layers 2, 3 have a different orientation of the strands.

An OSRB board, an OSRB sheet or OSRB panel basically have a multi-layer-structure with one, two, three, four, five or more layers. Different construction panel thicknesses and the properties can thereby be purposefully influenced.

In particular, the surface 4 is covered by a color or decor layer and/or protected from environmental impacts by a sealing layer.

The layer of material of reed is usually an outer layer 2. However, a layer of material of reed may also be used as core layer 3 in order to achieve a particularly high strength.

Preferably, further sustainable materials without strand structure like for example recycling material and/or cost efficient filler materials may be either added to the strand material or be used alone for the core layer 3, though. A biocomposite construction panel with particularly good mechanical properties can thereby be provided in different thicknesses with low production outlay.

Figure 3:
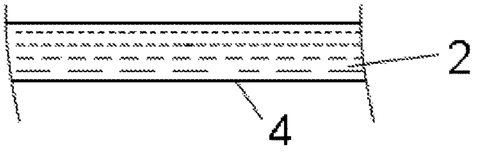

The FIG. 3 shows the cross section through an OSRB construction panel having only one layer of material 2 of reed, i.e. reed alone or together with straw and/or further strands of other plants. Also at a one-layer-panel, the surfaces 4 can be provided with one additional cover layer as described above.

Figure 4:
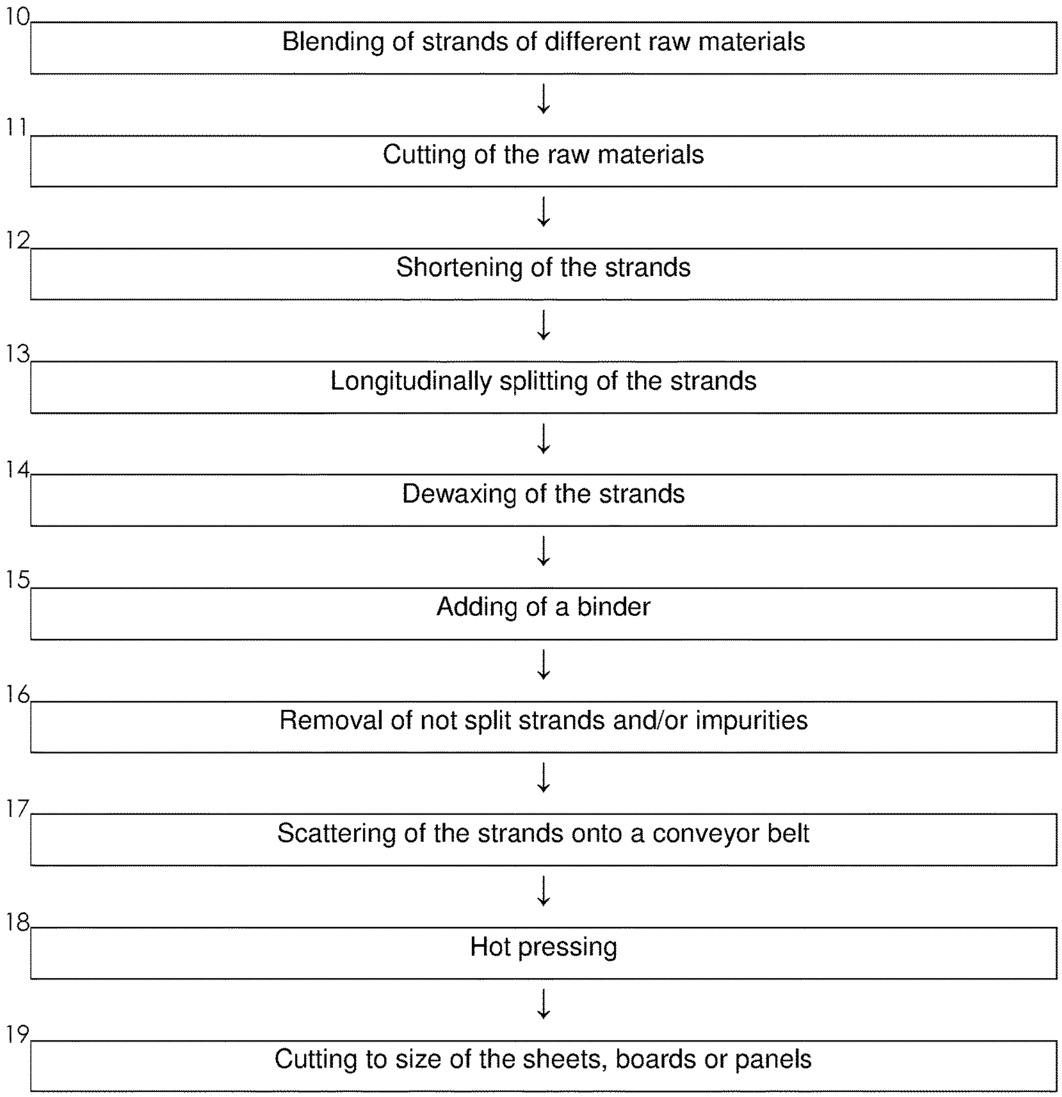

The FIG. 4 shows the steps 10 to 19 for the production of an OSRB plate, an OSRB board or an OSRB panel—thus of OSRB construction panel 1—based on reed and one further raw material. The steps are described in the following applying the example of straw as further raw material:

Already as first step, a blending 10 of the reed strands and straw strands with each other is conducted. What is following is a cutting 11 preferably to a length of 100 to 1000 mm, preferably 300 to 800 mm, particularly preferred 400 to 600 mm.

Subsequent to that, it is conducted a shortening 12 of the strands as well as a longitudinally splitting 13 and a dewaxing 14 of the strands by a solvent for an improved adhesion of the thereafter added binder 15. Not split strands and/or impurities such as metal are removed. Finally, a scattering 17 of the strands is conducted onto a conveyor belt under longitudinal alignment and/or grading (sorting) by length over an area in longitudinal direction over the conveyor belt. The thereby formed mat consisting of piled up strands is compressed 18 in a hot press at 100° C. to 300° C. and subsequently cut to size 19 to the desired dimensions and contour of the desired sheet, board or panel.

By means of additional surface treatments such as sand blasting and/or coating, the created sheets, boards or panels can be used as finished products for the interior construction such as wall covering or floor covering or for furniture, doorframes as well as container material.

A 100%-reed-construction-panel can be produced according to the steps of FIG. 4 without the step of blending 10.

The invention claimed is:

1. Sheet, board or panel comprising:

a layer of material (2) of compressed reed having a multiplicity of strands, which a majority of the multiplicity of strands are split longitudinally, so that at least a part of the inside of the strands is accessible to a binder, and a binder, wherein the binder allows to binding the reed for forming a solid sheet, board or panel, wherein the strands of the reed are afloat spears.

2. Sheet, board or panel of claim 1, wherein the layer of material (2) also comprises strands of straw.

3. Sheet, board or panel of claim 1, wherein 100% of the strands provided for the layer of material (2) are of reed.

4. Sheet, board or panel of claim 1, wherein when providing the strands based on different raw materials, blending (10) of the strands is provided prior to compressing (18).

5. Sheet, board or panel of claim 1, wherein a plurality of the strands of the layer of material (2) are oriented in a predetermined direction and/or substantially in parallel.

6. Sheet, board or panel of claim 1, wherein a portion of at least 10% of the strands have a length of at least 6 mm and at most 15 mm.

7. Sheet, board or panel of claim 1, wherein the layer of material (2) of compressed reed forms an outer layer (2), which adjoins to a core layer (3).

8. Method for producing a sheet, a board or a panel comprising a layer of material of compressed reed having a multiplicity of strands, which a majority of the multiplicity of strands are split longitudinally, so that at least a part of the inside of the strands is accessible to a binder, wherein the binder allows to binding the reed for forming a solid sheet, board or panel, wherein the majority of the multiplicity of strands that are mostly split longitudinally are covered with a binder and are compressed, wherein the strands of the reed are afloat spears.

9. Method of claim 8, wherein strands of different raw materials, including straws and reed, are blended (10).

10. Method of claim 8, wherein prior to scattering (17) the strands onto a conveyor belt for forming a mat, the strands are blended (10) prior to shortening (12) the strands or cutting (11) the raw materials to a smaller length.

* * * * *